June 5, 1962   B. B. REILLY   3,037,647
TRUCK UNLOADING STATION
Filed July 29, 1959   2 Sheets-Sheet 1

INVENTOR:
Bertram B. Reilly
BY Christy, Parmelee, Strickland
ATTORNEYS.

June 5, 1962

B. B. REILLY 3,037,647

TRUCK UNLOADING STATION

Filed July 29, 1959

INVENTOR.
Bertram B. Reilly
BY
Christy, Parmelee & Strickland
ATTORNEYS

United States Patent Office 3,037,647
Patented June 5, 1962

3,037,647
TRUCK UNLOADING STATION
Bertram B. Reilly, Pittsburgh, Pa., assignor to Dravo Corporation, Pittsburgh, Pa., a corporation of Pennsylvania
Filed July 29, 1959, Ser. No. 830,380
4 Claims. (Cl. 214—44)

This invention is for an unloading station for automotive dump trucks and relates to an apparatus for reducing the unloading time and enable the trucks to discharge their loads and move out of the way expeditiously and with minimum interference with one another.

The apparatus herein disclosed is particularly developed in connection with a municipal incinerator plant and will hereinafter be described particularly for such purpose, but it may be employed elsewhere where the rapid dumping of trucks in succession is required.

In municipal incinerator plants, dump trucks are generally used to collect rubbish and garbage and deliver it to the incinerator plant. These trucks usually start early in the day and may converge at the incinerator plant in numbers to empty their loads and return to their routes. The rate of collection is usually much more rapid than the rate of consumption of the material to be incinerated, so that large storage capacity is required in which the material is initially dumped and accumulated, and from which it is removed at the rate at which the incinerator will dispose of it. The trucks are customarily of the familiar type in which the front of the bed is elevated for dumping, while the rear end is pivoted, and the material discharges over the rear end of the truck.

One or more concrete pits are usually provided, and the trucks must be backed around to the edge of the pit and its cargo discharged into the pit. The turning of the trucks around and the backing of them to the edge of the pit not only requires an adequate area, but it requires skill and care on the part of the driver, and other trucks waiting to unload must not crowd the truck in making its turn, its backward approach to the edge of the pit, or its freedom to leave the area after it has dumped its load. Not infrequently there is spillage around the edge of the pit. A grab bucket is generally provided for transferring the material from the pit to the incinerator feed hopper or apparatus, and the first material dumped into the pit is the last to be removed.

An important object of the present invention is to provide a drive-through unloading station in which it is unnecessary to back the trucks up to the receiving pit, but wherein the trucks move only forwardly to dump their cargo and get out of the way.

A further important object of my invention is to provide means for cleaning the trackway for the trucks after each truck dumps its load, and for pushing such material into the pit or receiver before the next truck moves to dumping position.

A further object of my invention is to provide a receiver which is also a conveyor into which the material may be dumped, and from which the material may be unloaded directly into the incinerator more or less in the order in which it is received, thereby eliminating the need for a grab bucket and avoiding much of the many hours' stagnation before the garbage first dumped is consumed.

These and other objects and advantages are secured by my invention which may be more fully understood by reference to the accompanying drawings, in which.

Figure 1:
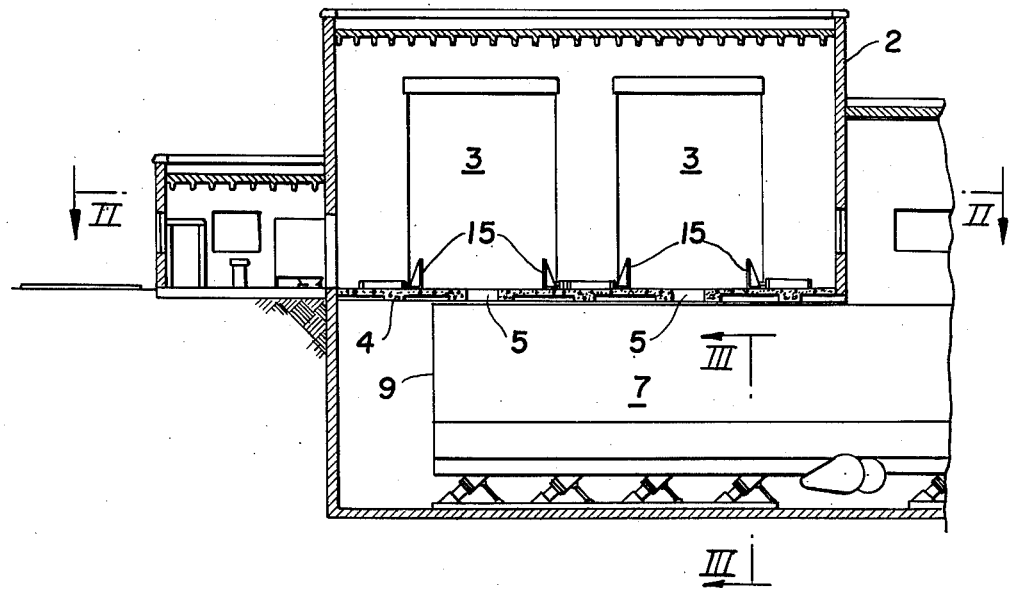
FIG. 1 is a longitudinal section through the unloading station of an incinerator plant embodying my invention.
Figure 2:
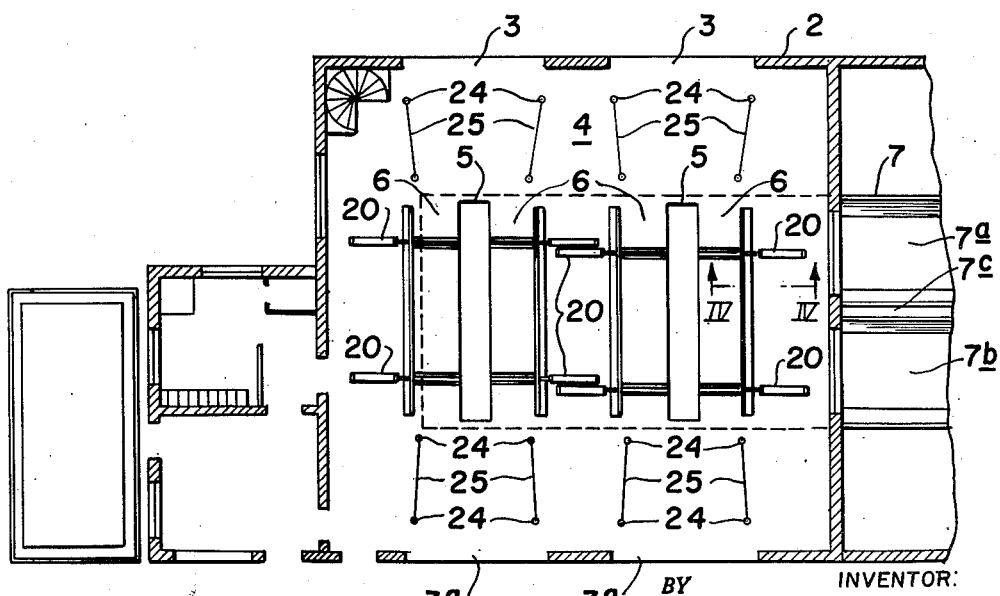
FIG. 2 is a top plan view of the station shown in FIG. 1 with the building shown in section, the section being in the plane of line II—II of FIG. 1.
Figure 3:
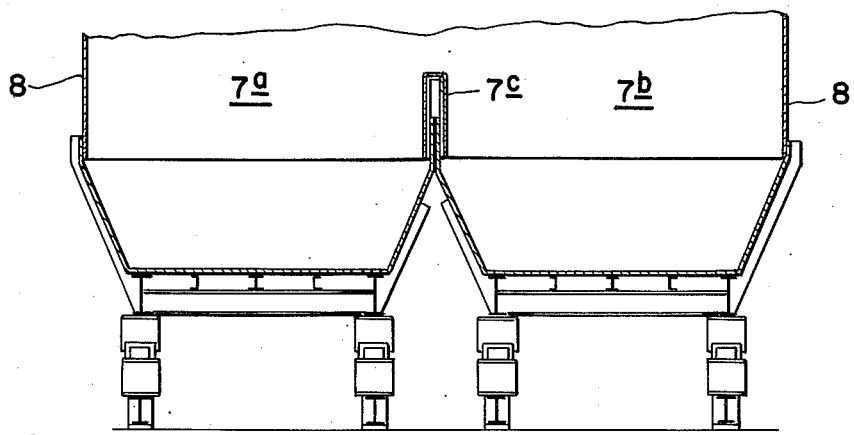
FIG. 3 is a transverse vertical section in the plane of line III—III of FIG. 1.

Referring to the drawings, 2 designates generally the walls of the building at the unloading station constituting part of an incinerator plant. There are here shown two doorways 3 in one side wall of the building, and two similar doorways 3a in the other side wall of the building opposite the doorways 3. There is a floor designated generally as 4 over which the trucks move as they enter one doorway and leave through the other, and between the two doorways 3 and 3a there is an elongated narrow opening 5 in the floor, while the area 6 at each side of each opening provides a track over which the truck wheels roll as the truck passes through the building.

Under the floor and extending transverse to the openings 5 is a conveyor designated generally as 7 which is wider than the length of the openings 5. The conveyor is here shown as comprising parallel shaking conveyors 7a and 7b with a longitudinal partition 7c therebetween. There are side walls 8 along each side of the conveyor which extend from a level directly under the floor down to the sides of the conveyor, and which telescope into the sides of the conveyors, and there is an end wall 9 at the receiving end of the conveyor extending between the two side walls 8 and from beneath the floor level down to the end of the conveyor. The arrangement is such that any material that is dumped through either of the openings 5 will fall onto the conveyor and be confined between the side walls 8 so that a large mass of material may be accumulated on the conveyor beneath the floor and be moved toward the right as viewed in FIG. 1 into a feeder (not shown), that charges material into an incinerator. Thus the conveyor with the side and end walls 8 and 9 constitutes a receiving and storage hopper, as well as a conveyor.

Figure 5:
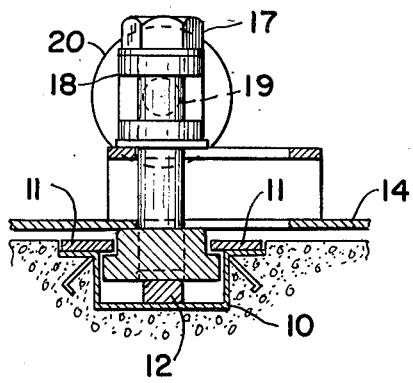
FIG. 5 is a fragmentary sectional view in the plane of line V—V of FIG. 4.
Figure 4:
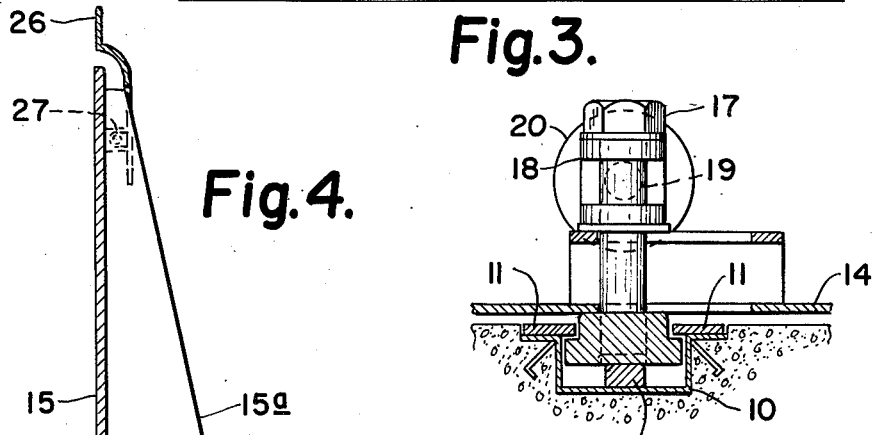
FIG. 4 is an enlarged fragmentary sectional view in the plane of line IV—IV of FIG. 2.

The floor area 6 is preferably formed of concrete, and has set into it near each end of the opening 5 at each side of the floor a metal channel 10, the construction of which is best seen in FIGS. 4 and 5. This channel has outwardly-turned sides to which are secured keeper plates 11 which are flush with the level of the floor area 6. There is a rectangular metal bar secured to the bottom web of these channels that extends lengthwise of the channels, the bar being designated 12. The inner end of each of the channels terminates at the opening 5, and there is a shoe 13 fitted into each channel that rests on the strip 12, and which is confined against vertical movement by the keeper plates 11, the shoe having shoulders at each side thereof below its top over which the plates 11 extend. This is most clearly shown in FIG. 6.

There is an angle bar 14 that is secured to the top of the two shoes at each side of each opening 5 so as to rigidly connect the two shoes, and a vertical metal plate 15 is secured to the vertical leg of this angle by welding. This plate is preferably about as long as the opening 5, and there are two such plates, one at each side of each of the openings 5. Bolted to the confronting faces of the two plates 15 are replaceable scraper plates 16, the bottom edges of which are chamfered to scrape along the floor areas 6. There is a pin 17 attached to each shoe. This pin passes through a yoke 18 at the end of a piston rod 19, there being a piston (not shown) that works in a fluid pressure cylinder 20 located at the end of each channel 10 remote from the opening 5. The end of the cylinder 20 opposite the piston rod is pivotally secured at 21 to a fixed bracket 22 bolted to the floor. The distance between the confronting faces of the two plates 15 at the opposite sides of the opening 5 is somewhat greater than the width of a dump truck body. The arrangement is such that the truck is driven onto the area 6 between two of the plates 15 and over the opening 5, and when the truck has advanced sufficiently far, it is dumped in the usual manner. Much of the material will immediately fall through the opening 5, but some of it will come to rest on the area 6 behind the rear wheels of the truck. The truck may be moving slowly forward as the truck body is emptying. After the truck has cleared the space between the two confronting plates 15, fluid pressure is admitted to the cylinders 20, whereupon the confronting plates 15 are moved toward each other across the area 6, pushing any material that reposes on the area 6 into the opening 5. The stroke of the pistons is set so that the plates will travel to the very edge of the opening 5, but the shoes 13 cannot be moved beyond the open ends of the channels 10. In this way any material that falls into the channels will be pushed out of the channels by the respective shoes into the opening 5 and into the collecting conveyor below these openings. In FIG. 5 I have shown a stop 23 that limits the rearward travel of the shoes, and this stop is preferably welded in place in the field at the time the installation is made so as to limit the stroke of the piston to the exact distance required.

In the accompanying drawings I have shown a dumping station in which the floor area has two parallel dumping areas, but in a smaller plant only one of these might be required, and in a larger plant there could be more. As a safety measure posts 24 are set in the floor areas at the entrance and exit of each dumping area, these posts being connected by a guard chain 25 so that the trucks must pass straight through between the plates 15 and protect the plates from being run against by the truck wheels.

After each truck has dumped its load the plates 15 are operated to clear the area 6 before the next truck moves into position to dump its load. Controls such as stop and go lights or barriers may be provided to prevent any truck from moving into the dumping area while the scrapers are moving across the area 6. In the drawings I have shown a control bar 26 extending along the top edge of the entire length of the scraper and pivotally supported on brackets 27 at intervals along the scraper designed to interlock with the controls for the cylinders 20 so that if the cylinders are energized while a truck or person is in position between the two plates 15, these bars will be contacted to prevent the further operation of the cylinders, or to otherwise signal the operator that a truck is positioned on the dumping area. This is to prevent any damage to the scrapers by premature operation, or eliminate accidents.

At the back of the scrapers are gusset plates 15a which are welded thereto and to the horizontal leg of the angle 14 to insure proper rigidity of the plates 15.

It will therefore be seen that with my invention the trucks move continuously forward into the dumping station at one side and out of the other, and it is unnecessary to back the trucks around and to maneuver the rear end of the trucks into position at the edge of the receiving pit. It will also be seen that garbage and rubbish is continuously cleaned away from the dumping area, and at the end of the day's run the dumping area can be readily hosed down and cleaned. The conveyor may be operating continuously while the dumping operation is proceeding, and the material first dumped will start to be carried away as soon as it falls into the hopper provided by the conveyor and the side and end walls 8 and 9, and while it is expected that material will accumulate in the bin or hopper provided between these walls, the material generally moves toward the discharge end of the conveyor in the order in which it is dumped, and there will be no long periods of stagnation such as occurs when the rubbish and garbage is dumped into a receiving pit to be subsequently removed by a clamshell bucket.

While I have shown and described one particular embodiment of my invention it will be understood that this is by way of illustration and that various changes and modifications may be made in the construction and arrangement of parts within the contemplation of my invention and under the scope of the following claims.

I claim:

1. A truck unloading station comprising a receiving bin, a floor over which trucks may move extending over the receiving bin, the floor having an elongated opening therethrough through which material may fall into the bin, there being a truck-supporting area extending along each side of the opening parallel therewith, a scraper at each side of the opening movable transversely across the truck-supporting area toward and away from the edge of the opening, means for effecting movement of the scrapers toward and away from the opening, and means in advance of the truck-supporting areas along each side of the opening for confining the movement of a truck to the truck-supporting areas at each side of the opening and protecting the scrapers against impingement by the truck when the scrapers are in a position most remote from the opening.

2. A truck unloading station comprising a receiving bin, a floor over which trucks may move extending over the receiving bin, the floor having an opening therethrough which is elongated in the direction of travel of the trucks over the opening, a truck-supporting area along each side of the opening, a pair of parallel channel-shaped rails in the truck-supporting area at each side of the opening, the rails of each pair being disposed at opposite sides of the middle of the opening with the tops of the rails flush with the level of the floor, a shoe slidable along each rail from the edge of the opening to a retracted position clear of the path of travel of the truck over the truck-supporting area, a scraper at each side fo the opening carried by the shoes at each side of the opening, and means for effecting movement of each scraper from the edge of the opening to a retracted position at the side of the truck-supporting area along the opening.

3. A truck unloading station comprising a receiving bin having a bottom in the form of a conveyor for moving material longitudinally and having side walls extending above the conveyor, a floor over the bin, an opening in the floor elongated in a direction transverse to the longitudinal axis of the conveyor, said floor having a truck wheel supporting area at each side of the opening and extending parallel with the opening so that a truck may move over the floor with its body substantially centered above the opening, and a scraper at each side of the opening movable across the truck-supporting area in a direction transverse to the length of the opening and from an extended position adjacent the edge of the opening to a retracted position clear of the wheels of the truck moving along the truck-supporting areas at each side of the opening.

4. A truck unloading station comprising a receiving bin, a floor over which trucks may move over the receiving bin, the floor having an opening therethrough with a truck-supporting area at each side of the opening, scrapers at each side of the opening movable over the floor toward the edge of the opening across the truck-supporting area, means for operating the scrapers, the truck-supporting area at each side of the opening having a pair of parallel guideways therein recessed below the floor, each scraper having a pair of shoes attached thereto, each shoe being movable along a guideway.

References Cited in the file of this patent
UNITED STATES PATENTS

| | | |
|---|---|---|
| 879,839 | Sanderson | Feb. 18, 1908 |
| 1,143,852 | Newman | June 22, 1915 |
| 1,350,087 | Trapp | Aug. 17, 1920 |
| 1,744,106 | Coll | Jan. 21, 1930 |
| 2,536,672 | Tyrrell | Jan. 2, 1951 |
| 2,543,518 | Baechli | Feb. 27, 1951 |
| 2,699,878 | Avery | Jan. 18, 1955 |